United States Patent [19]

Brown

[11] 3,886,146

[45] May 27, 1975

[54] 17-HYDROXY-3-OXO-17α-PREGNA-4,7-DIENE-21-CARBOXYLIC ACID-LACTONE, 4',5'-DIHYDROSPIRO[ANDROSTA-4,7-DIENE-17,2'(3'H)-FURAN]-3-ONE, AND INTERMEDIATES THERETO

[75] Inventor: Edward A. Brown, Glenview, Ill.

[73] Assignee: G. D. Searle & Co., Chicago, Ill.

[22] Filed: Mar. 8, 1974

[21] Appl. No.: 449,276

[52] U.S. Cl.............. 260/239.55 R, 260/239.57, 260/397.1; 424/238
[51] Int. Cl............................................ C07c 173/00
[58] Field of Search.............................. 260/239.57

[56] References Cited
UNITED STATES PATENTS
3,787,394   1/1974   Arth et al................. 260/239.55 R Primary Examiner—Elbert L. Roberts
Attorney, Agent, or Firm—John M. Brown

[57] ABSTRACT

Preparation of DCA-blocking 17-hydroxy-3-oxo-17α-pregna-4,7-diene-21-carboxylic acid γ-lactone and 4',5'-dihydrospiro[androsta-4,7-diene-17.2'(3'H)-furan]-3-one from estrongenic intermediates is disclosed.

7 Claims, No Drawings

17-HYDROXY-3-OXO-17α-PREGNA-4,7-DIENE-21-CARBOXYLIC ACID-LACTONE, 4′,5′-DIHYDROSPIRO[ANDROSTA-4,7-DIENE-17,2′(3′H)-FURAN]-3-ONE( AND INTERMEDIATES THERETO

This invention relates to 17-hydroxy-3-oxo-17α-pregna-4,7-diene-21-carboxylic acid γ-lactone, 4′,5′-dihydro-spiro[androsta-4,7-diene-17,2′ (3′H)-furan]-3-one, intermediates thereto, and processes for their preparation. More particularly, this invention provides new, useful, and unobvious steroids of the formula

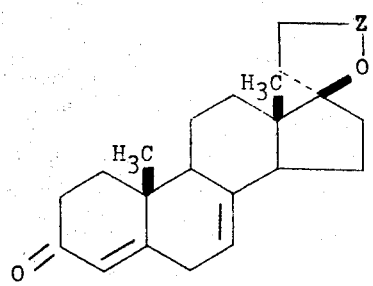

wherein Z represents carbonyl or methylene. Equivalent to the enformulated compounds, for the purposes of this invention, are the hydroxy acid and salts and esters thereof preparable by procedures well-known in the art and having the formula

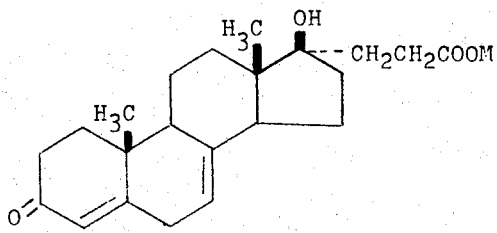

in which M represents hydrogen, alkali metal, alkaline earth metal/2, ammonium, or lower alkyl. Those skilled in the art will recognize that the term "alkaline earth metal/2" reflects the fact that such metals are divalent, whereas the other substituents represented by M are monovalent; and when, for example, M represents Ca/2, the contemplated salt is conventionally depicted thus

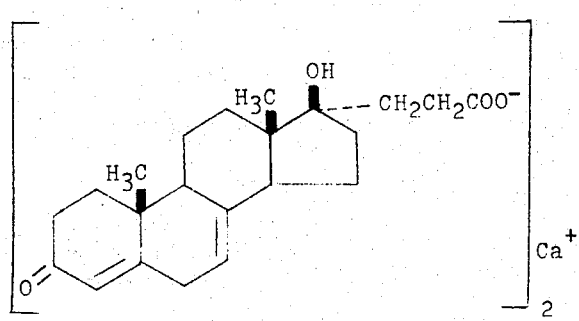

The products of this invention are useful by reason of their valuable biological properties. Thus, for example, they are diuretic: They reverse the effect of desoxycorticosterone acetate (DCA) on urinary sodium and potassium.

The capacity of the instant compounds to reverse the renal electrolyte effects of DCA is evident from the results of a standardized test for this property carried out in rats substantially as described by C. M. Kagawa in chapter 34 of volume II of "Evaluation of Drug Activities: Pharmacometrics" by D. R. Laurence and A. L. Bacharach. Details of such testing are described in U.S. Pat. Nos. 3,422,096 and 3,622,631. The median effective dose of the representative product of Example 1C hereinafter in tests carried out substantially as described in the aforesaid patents was 0.52 mg. administered subcutaneously.

Those skilled in the art will recognize that observations of activity in standardized tests for particular biological effects are fundamental to the development of valuable new drug products, both veterinary and human.

Preparation of the lactone and cyclic ether of this invention proceeds by heating a steroid of the formula

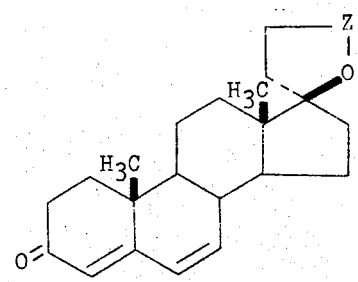

with acetic anhydride and acetyl chloride in a nitrogen atmosphere to produce an enol acetate of the formula

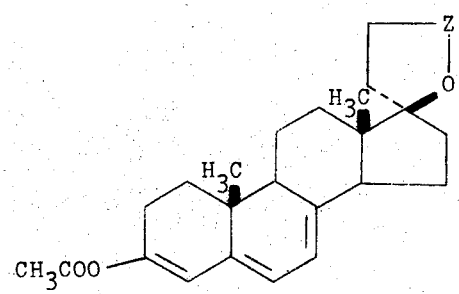

which is contacted in the absence of incident light under nitrogen, using diethyl ether and methanol as solvents, with sodium tetrahydroborate(1-) and water. The resultant 5,7-dien-3β-ol

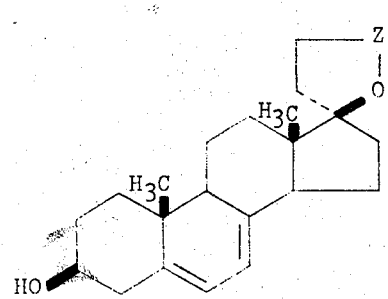

is converted to the desired lactone or cyclic ether via Oppenauer oxidation. In the three formulas immediately preceding, "Z" retains the meaning assigned above. Compounds of the latter two formulas, in addition to being useful as intermediates, are estrogenic.

The following examples described in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. A mixture of 110 parts of 17-hydroxy-3-oxo-17α-pregna-4,6-diene-21-carboxylic acid γ-lactone (U.S. Pat. No. 2,900,383), 550 parts of acetic anhydride, and 110 parts of acetyl chloride is heated at 90°–95° in a nitrogen atmosphere for 17 hours, then cooled — first to 25° and finally to 5°. The crystalline precipitate which forms is filtered off, washed with 160 parts of ice-cold methanol, and recrystallized from methanol to give 3β-acetoxy-17-hydroxy-17α-pregna-3,5,7-triene-21-carboxylic acid γ-lactone melting at 194°–197°.

B. To a solution of 382 parts of 3β-acetoxy-17-hydroxy-17α-pregna-3,5,7-triene-21-carboxylic acid γ-lactone in 28,000 parts of diethyl ether and 56,000 parts of methanol, protected from incident light and under a nitrogen atmosphere, is added, with stirring, a solution of 700 parts of sodium tetrahydroborate(1-) in 16,000 parts of methanol and 6,000 parts of water. Stirring is continued for 3½ hours, whereupon the reaction mixture is poured into 300,000 parts of cold water. The resultant mixture is extracted with ethyl acetate. The ethyl acetate extract is washed with water, dried over anhydrous sodium sulfate, and stripped of solvent by vacuum distillation. The residue, on recrystallization from methanol, affords 3β,17-dihydroxy-17α-pregna-5,7-diene-21-carboxylic acid γ-lactone melting at 193°–198°.

C. A solution of 342 parts of 3β,17-dihydroxy-17α-pregna-5,7-diene-21-carboxylic acid γ-lactone in 13,500 parts of dry toluene and 2,300 parts of cyclohexanone is heated nearly to boiling, with stirring under nitrogen. A solution of 342 parts of aluminum isopropoxide in 13,500 parts of dry toluene is thereupon introduced, and the reaction mixture is then brought quickly to boiling under reflux and maintained thereat for 15 minutes, stirring being continued throughout. The mixture is then cooled to 25° and diluted with 1,450 parts of a saturated aqueous solution of Rochelle salt. The mixture thus obtained is steam distilled until the distillate is clear, whereupon the distilland is extracted with dichloromethane. The dichloromethane extract is washed with water, dried over anhydrous sodium sulfate, and stripped of solvent by vacuum distillation. The oily residue is crystallized from ethyl acetate to give 17-hydroxy-3-oxo-17α-pregna-4,7-diene-21-carboxylic acid γ-lactone.

EXAMPLE 2

A. Substitution of 105 parts of 4′,5′-dihydrospiro[androsta-4,6-diene-17,2′(3′H)-furan]-3-one [J. Med. Chem., 6, 617 (1963)] for the 17-hydroxy-3-oxo-17α-pregna-4,6-diene-21-carboxylic acid γ-lactone called for in Example 1A affords, by the procedure there detailed, 3β-acetoxy-4′,5′-dihydrospiro[androsta-3,5,7-triene-17,2′(3′H)-furan].

B. Substitution of 368 parts of 3β-acetoxy-4′,5′-dihydrospiro[androsta-3,5,7-triene-17,2′(3′H)-furan] for the 3β-acetoxy-17-hydroxy-17α-pregna-3,5,7-triene-21-carboxylic acid γ-lactone called for in Example 1B affords, by the procedure there detailed, 4′,5′-dihydrospiro[androsta-5,7-diene-17,2′(3′H)-furan]-3β-ol.

C. Substitution of 328 parts of 4′,5′-dihydrospiro[androsta-5,7-diene-17,2′(3′H)-furan]-3β-ol and 328 parts of aluminum isopropoxide for the 3β,17-dihydroxy-17α-pregna-5,7-diene-21-carboxylic acid γ-lactone and 342 parts of aluminum isopropoxide, respectively, called for in Example 1C affords, by the procedure there detailed, 4′-dihydrospiro[androsta-4,7-diene-17,2′(3′H)-furan]-3-one. What is claimed is:

1. A compound of the formula

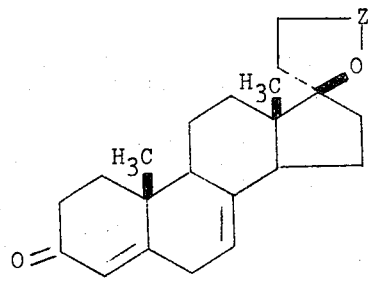

wherein Z represents carbonyl or methylene.

2. A compound according to claim 1 which is 17-hydroxy-3-oxo-17α-pregna-4,7-diene-21-carboxylic acid γ-lactone.

3. A compound according to claim 1 which is 4′,5′-dihydrospiro[androsta-4,7-diene-17,2′(3′H)-furan]-3-one.

4. A compound of formula

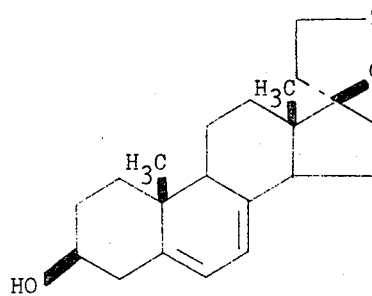

wherein Z represents carbonyl or methylene.

5. A compound according to claim 4 which is 3β,17-dihydroxy-17α-pregna-5,7-diene-21-carboxylic acid γ-lactone.

6. A compound according to claim 4 which is 4′,5′-dihydrospiro[androsta-5,7-diene-17,2′(3′H)-furan]-3β-ol.

7. 3β-Acetoxy-4′,5′-dihydrospiro[androsta-3,5,7-triene-17,2′(3′H)-furan].

* * * * *

UNITED STATES PATENT OFFICE
CERTIFICATE OF CORRECTION

PATENT NO. : 3,886,146
DATED : May 27, 1975
INVENTOR(S) : Edward A. Brown

It is certified that error appears in the above–identified patent and that said Letters Patent are hereby corrected as shown below:

Title, "ACID-LACTONE" should read -- ACID γ-LACTONE --.

Abstract, "17.2'" should read -- 17,2' --.

Column 1, line 2, "ACID-LACTONE" should read --ACID γ-LACTONE--.

Column 1, line 4, "ONE(" should read -- ONE, --.

Column 4, line 20, "4'-" should read -- 4',5'- --.

Signed and Sealed this twenty-eight Day of October 1975

[SEAL]

Attest:

RUTH C. MASON
Attesting Officer

C. MARSHALL DANN
Commissioner of Patents and Trademarks